(12) United States Patent
Mount

(10) Patent No.: US 7,368,038 B2
(45) Date of Patent: May 6, 2008

(54) ANTI-PRESSURE SYSTEM

(75) Inventor: Dennis William Mount, Ottawa (CA)

(73) Assignee: Chem-Champ (Barbados) Inc., Bridgetown (BB)

( * ) Notice: Subject to any disclaimer, the term of this patent is extended or adjusted under 35 U.S.C. 154(b) by 298 days.

(21) Appl. No.: 10/363,242

(22) PCT Filed: Aug. 23, 2001

(86) PCT No.: PCT/CA01/01177

§ 371 (c)(1),
(2), (4) Date: Aug. 25, 2003

(87) PCT Pub. No.: WO02/20114

PCT Pub. Date: Mar. 14, 2002

(65) Prior Publication Data

US 2005/0098424 A1    May 12, 2005

(30) Foreign Application Priority Data

Sep. 6, 2000    (CA)    ................................. 2317620

(51) Int. Cl.
*B01D 3/00* (2006.01)
(52) U.S. Cl. .................. 202/160; 202/170; 202/237
(58) Field of Classification Search ................ 202/160, 202/170, 237; 203/100
See application file for complete search history.

(56) References Cited

U.S. PATENT DOCUMENTS

| | | | |
|---|---|---|---|
| 224,075 A * | 2/1880 | Clark | .................. 202/170 |
| 3,261,764 A | 7/1966 | Cullen | |
| 4,323,429 A * | 4/1982 | Hoover | .................. 202/83 |
| 4,536,256 A * | 8/1985 | Pastor | .................. 202/164 |
| 4,830,710 A * | 5/1989 | Thompson | .................. 202/170 |
| 5,246,549 A * | 9/1993 | Heil | .................. 203/2 |
| 5,287,702 A | 2/1994 | Hering et al. | |
| 5,445,714 A * | 8/1995 | Myers | .................. 202/176 |
| 5,770,020 A * | 6/1998 | Koistinen et al. | .................. 202/172 |
| 5,904,807 A * | 5/1999 | Ramm-Schmidt et al. | .. 159/43.1 |
| 6,648,010 B1 * | 11/2003 | Goodwin | .................. 137/493.1 |
| 6,797,123 B2 | 9/2004 | Beijbom | |

FOREIGN PATENT DOCUMENTS

| | | |
|---|---|---|
| EP | 0 356 638 A1 | 3/1990 |
| GB | 640-704 | 7/1950 |
| WO | WO-01 03810 A2 | 1/2001 |

* cited by examiner

Primary Examiner—Virginia Manoharan
(74) Attorney, Agent, or Firm—Botkin & Hall, LLP

(57) ABSTRACT

An anti-pressure system for a vessel which is subject to internal pressure created by heating or boiling of its contents, the system including first and second spaced-apart outlets for vapor to exit the vessel, each outlet having a first side communicating with the vessel interior and a second side communicating with the vessel exterior. The invention provides a reliable method of protecting a normally unpressurized vessel, such as an autoclave, distillation vessel, boiler or the like, from dangerous pressure build-up, resulting from its vapor outlet being blocked, regardless of what other pressure release devices, if any, may be present on the vessel.

3 Claims, 6 Drawing Sheets

ANTI-PRESSURE SYSTEM

FIELD OF THE INVENTION

The present invention relates generally to an anti-pressure system. More particularly, the present invention relates to an anti-pressure system for a vessel which is subject to internal pressure created by heating or boiling of its contents.

BACKGROUND OF THE INVENTION

There are many examples of vessels wherein the contents are subjected to heating or boiling. Examples are autoclaves, distillation vessels, boilers, etc. With the exception of vessels such as pressure cookers, wherein pressure build-up is intentional and the vessel is constructed to withstand internal pressures, it is customary to provide an outlet for vapour generated during the boiling or distillation process. In such cases, it is also desirable to provide a pressure relief means which will allow vapour to be vented from the vessel in the event that the internal pressure rises to a dangerous level, caused by blockage of the vapour outlet. An example of a situation where such a blockage could occur is where the vessel has an internal liner, as may be the case with a distillation vessel. Such a liner may be in the form of a bag inside the distillation vessel, as described in Canadian Patent Application No. 2,277,449. The material to be processed—for example, used solvent from a cleaning process—is placed in the bag and the vessel heated to drive off the solvent vapour, which exits through an outlet to a condensation/collection vessel. In the event the outlet opening would ever be blocked, for safety reasons there should be some kind of anti-pressure device incorporated into the distillation vessel, such as an anti-pressure valve placed on the cover of the vessel to release before any significant pressure build up can occur. In the aforementioned Canadian Patent Application No. 2,277,449 the cover itself was designed to release at almost any sign of positive pressure. However during field tests it was found that, in certain instances, this anti-pressure device was not effective against a dangerous pressure build up and release. The cause was the bag being overfilled with solvent, which overflowed behind the bag. As the vessel heated up, the solvent behind or outside the bag began to vaporize and expand. As the vapour expanded, more liquid from inside the bag overfilled to the outside of the bag, creating more vapour until the bag was pushed upwardly from underneath and eventually covered the vapour exit. Now, with the vapour exit blocked, the cover should have released, but did not, as the bag being pushed from the inside out in a balloon effect pushing on the cover and eventually pushing the cover open could not release the pressure, because the bag itself was sealing the opening. The bag continued to expand inside the vessel until finally hot solvent burst from the inside to the surrounding area. This, of course, is very dangerous and could occur in any container that has the possibility of its normal vapour outlet and any pressure release device being blocked.

Hence there is a need for a more reliable method of protecting a normally un-pressurized vessel from dangerous pressure build up, resulting from its vapour outlet being blocked, regardless of what other pressure release devices (if any) may be present on the vessel.

SUMMARY OF THE INVENTION

In a first aspect, the present invention provides an anti-pressure system for a vessel which is subject to internal pressure created by heating or boiling of its contents, the system comprising first and second spaced-apart outlets for vapour to exit the vessel, each outlet having a first side communicating with the vessel interior and a second side communicating with the vessel exterior.

Preferably, the first outlet is located above the second outlet and the second side of the first outlet communicates with the second side of the second outlet through a conduit extending downwardly from the second side of the first outlet to the second side of the second outlet. The conduit is preferably located within the vessel and is provided with a plurality of openings in a wall of the conduit to allow vapour from the vessel to enter the conduit through the openings and to exit the vessel through the second side of the first outlet. In a preferred embodiment, the conduit comprises a tube and in a further preferred embodiment, the second side of the first outlet is formed by an elbow communicating with the vessel exterior and the tube communicates with and extends downwardly from the elbow. In an alternative preferred embodiment, the conduit is formed by an elongated shroud having the openings therein and secured to an internal wall surface of the vessel. Preferably, the conduit extends downwardly adjacent an internal wall surface of the vessel and, where a liner or bag is used in the vessel, the conduit extends between the liner or bag and the internal wall surface of the vessel.

Alternatively, the second outlet communicates directly with the exterior of the vessel. In the case where vapour exiting the vessel is supplied by means of a first conduit to a condensation/collection vessel for the vapour, a second conduit may be provided either between the second outlet and the condensation/collection vessel or between the second outlet and the first conduit. A one-way valve may be provided to prevent flow of vapour through the second conduit to the second outlet.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
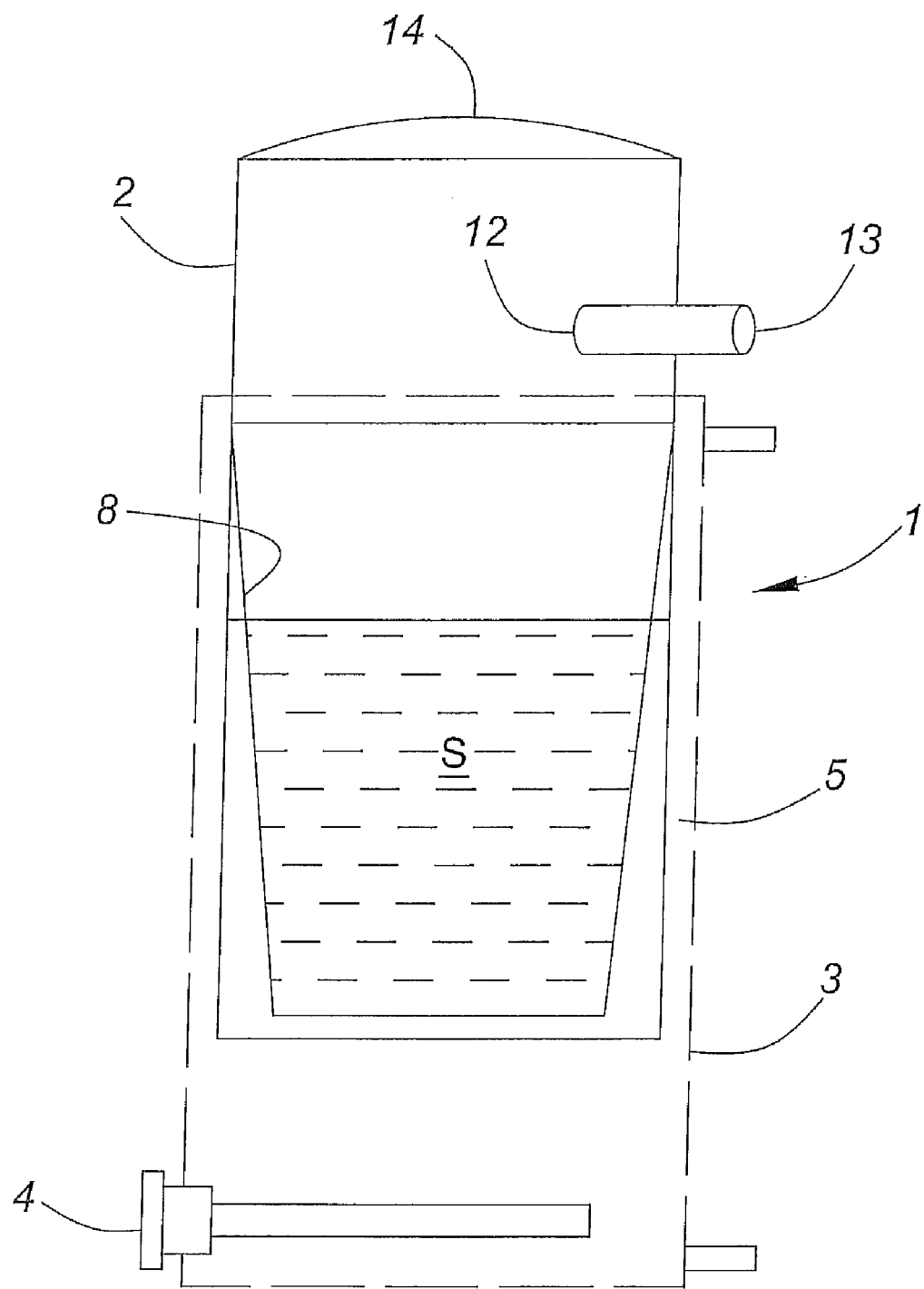
FIG. 1 is a sectional view of a distillation module of the type described in our Canadian Patent Application No. 2,277,449.

FIG. 1 shows a distillation module [1] as used in the solvent vapour recovery system described in Canadian Patent Application No. 2,277,449. The distillation module [1] comprises a distillation vessel [2] in which contaminated solvent or solvent mixture [S] to be recovered is collected. The distillation vessel [2] is closed to prevent the escape of any vapour generated therein other than through an outlet [12] having a first side communicating with the vessel interior and a second side communicating with the vessel exterior through a conduit [13], which leads to a condensation/collection vessel (not shown). The sizes of the outlet [12] and conduit [13] are made adequate to allow free passage of vapour from the distillation vessel [2] without resulting in a pressure build up in the distillation vessel [2]. Further, the outlet [12] is ideally positioned toward the upper end of the distillation vessel [2] since the hot vapour will rise. Heat is applied to the vessel [2] to vaporize the solvent and in the particular example shown in FIG. 1, it is applied by means of a larger heating vessel [3] containing an oil bath [5], within which the distillation vessel [2] sits. The heating vessel [3] is provided with one or more heating elements [4] immersed in the oil and, in operation, each heating element [4] heats the oil [5] which in turn heats the distillation vessel [2] at least until the solvent [S] within the distillation vessel reaches its boiling point and vapour is generated. Once the boiling point of the solvent is reached, the power supplied to the heating element is controlled to regulate the rate of vaporization of the solvent until the solvent is substantially all evaporated. Of course, it is not important to the present invention what type of heating arrangement is employed and the foregoing arrangement is shown merely by way of illustration.

Continued heating of the distillation vessel drives off any residual solvents and bakes any contaminants in the distillation vessel so that the resulting solids can be disposed of more conveniently at a lower cost and with reduced environmental problems as compared to unbaked contaminants. Typically, the distillation vessel is lined with a bag [8] such that, following baking, the entire bag [8] containing the baked contaminants can be disposed of. The bag [8] is stable within the temperature range of the distillation vessel [2] and is inert with respect to the solvents to be distilled. The bag [8] is made of any suitable material that is heat stable, does not react with the solvents to be distilled, and is non-permeable.

In the event that the outlet [12] used as the vapour outlet to the cooling system would ever be blocked, for safety reasons, some kind of anti-pressure device is incorporated into the vessel lid or cover [14]. Such device may be an anti-pressure valve placed on the cover of the vessel to release before any significant pressure build up can occur or the cover itself may be designed to release at almost any sign of positive pressure. However, it has been found in certain instances that anti-pressure devices incorporated into the vessel lid or cover are not always effective to prevent dangerous pressure build up and release.

Figure 2:
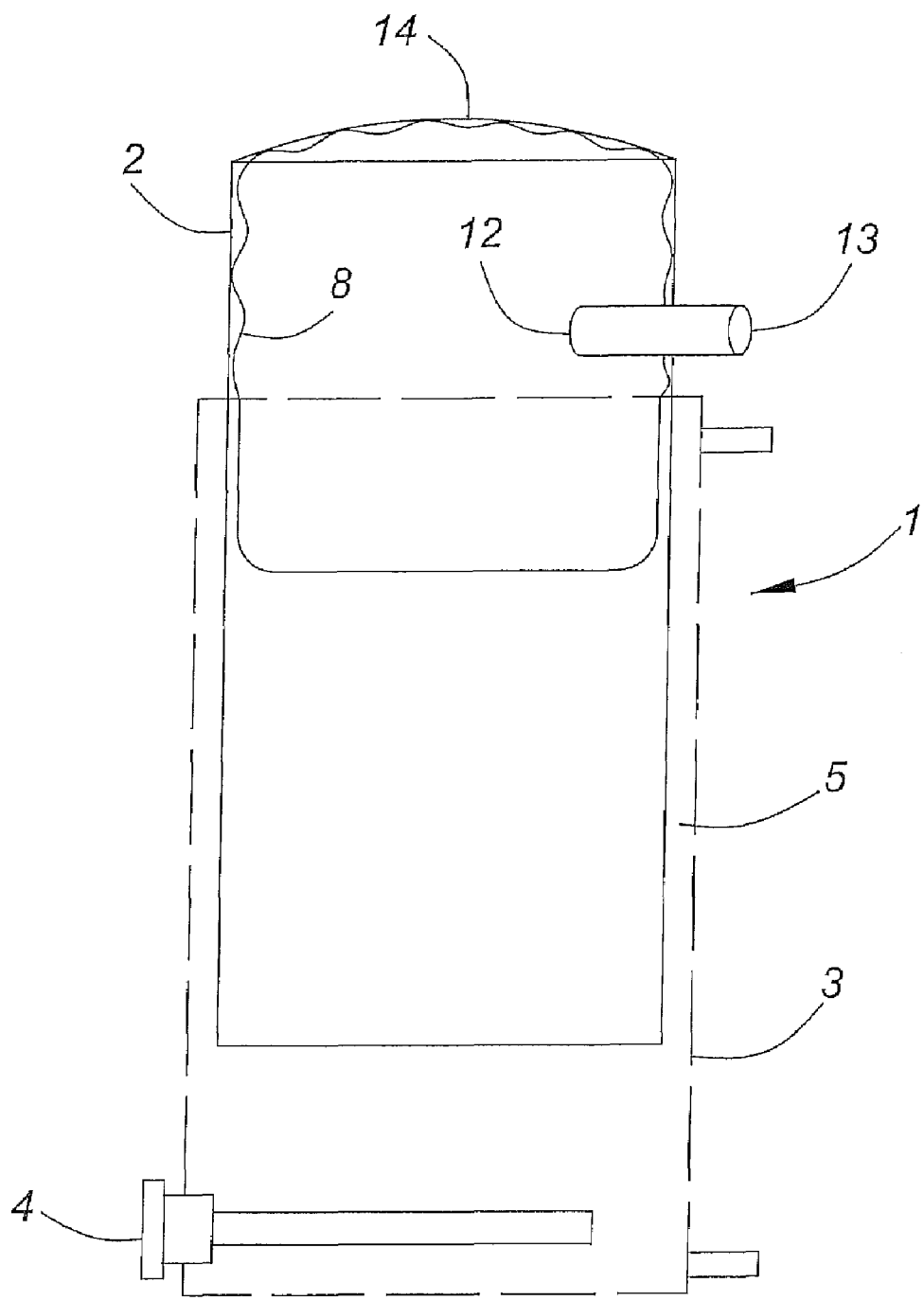
FIG. 2 is a sectional view of the distillation module of FIG. 1, showing the bag in its deformed condition.

As noted above, the cause has been found to be that the distillation bag can be overfilled and solvent can therefore overflow and accumulate behind the bag. Under these conditions, as the vessel heats up, the solvent behind or outside the bag begins to vaporize and expand. As the vapour expands, more liquid from inside the bag overflows to the outside of the bag, creating more vapour between the bag and the vessel until the bag is deformed by being pushed upwards from underneath and eventually covers the vapour outlet [12] (see FIG. 2). Now with the vapour outlet blocked, the increasing pressure within the vessel should cause the anti-pressure device to release, but it may not do so in all cases as the bag being pushed from the inside out in a balloon effect pushing on the cover and eventually pushing the cover open prevents the anti-pressure device from releasing the pressure as the bag itself can seal the opening. The bag can continue to expand outside the vessel until finally hot solvent from the inside bursts over the surrounding area.

Another possible source of blockage, which can occur even when a liner is not present, is sludge from the used solvent which could block the outlet if insufficient care is used in pouring the used solvent into the vessel.

Figure 3:
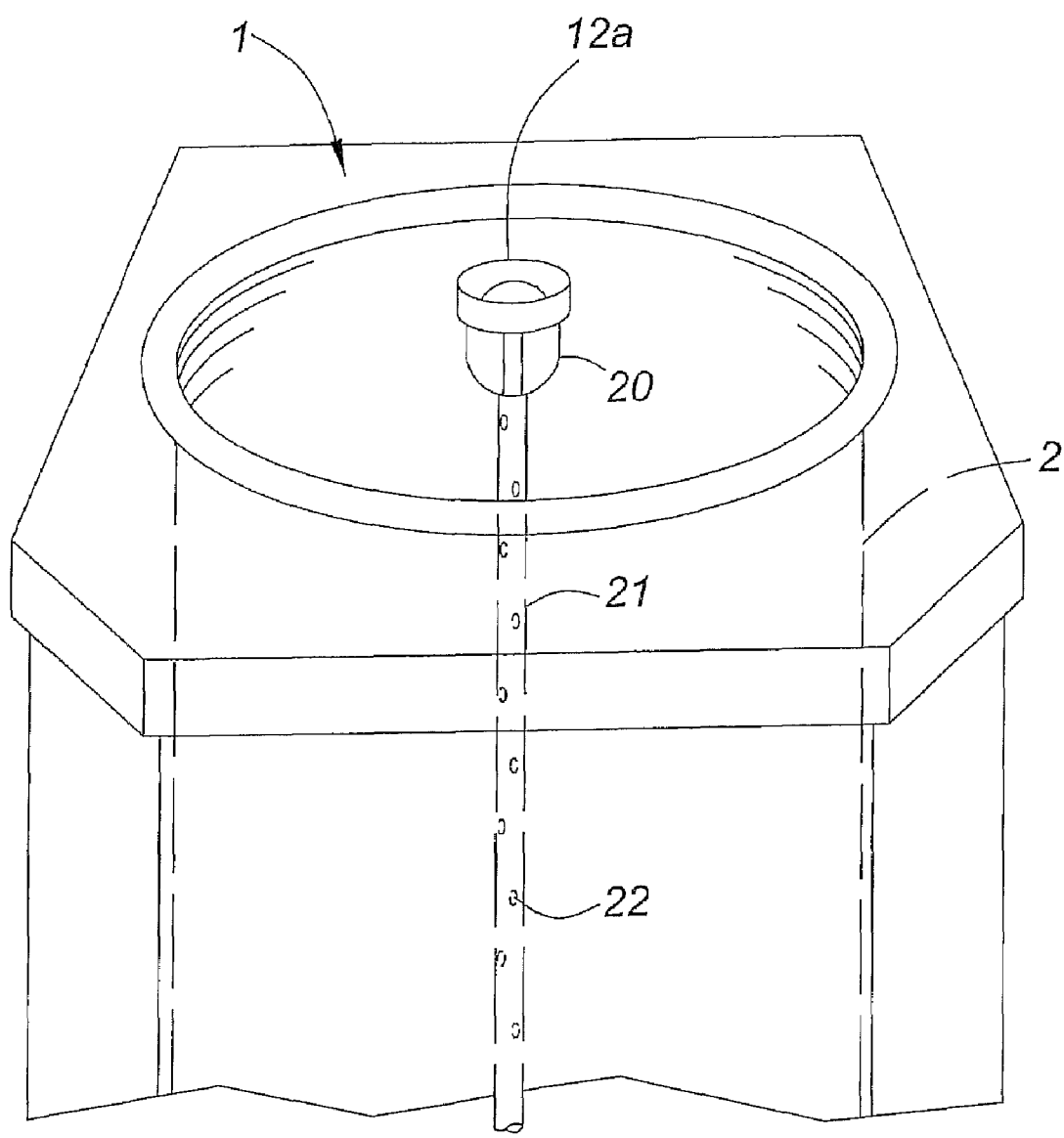
FIG. 3 is a perspective view of an upper region of the distillation module of FIG. 1, showing an anti-pressure device according to one embodiment of the invention.
Figure 4:
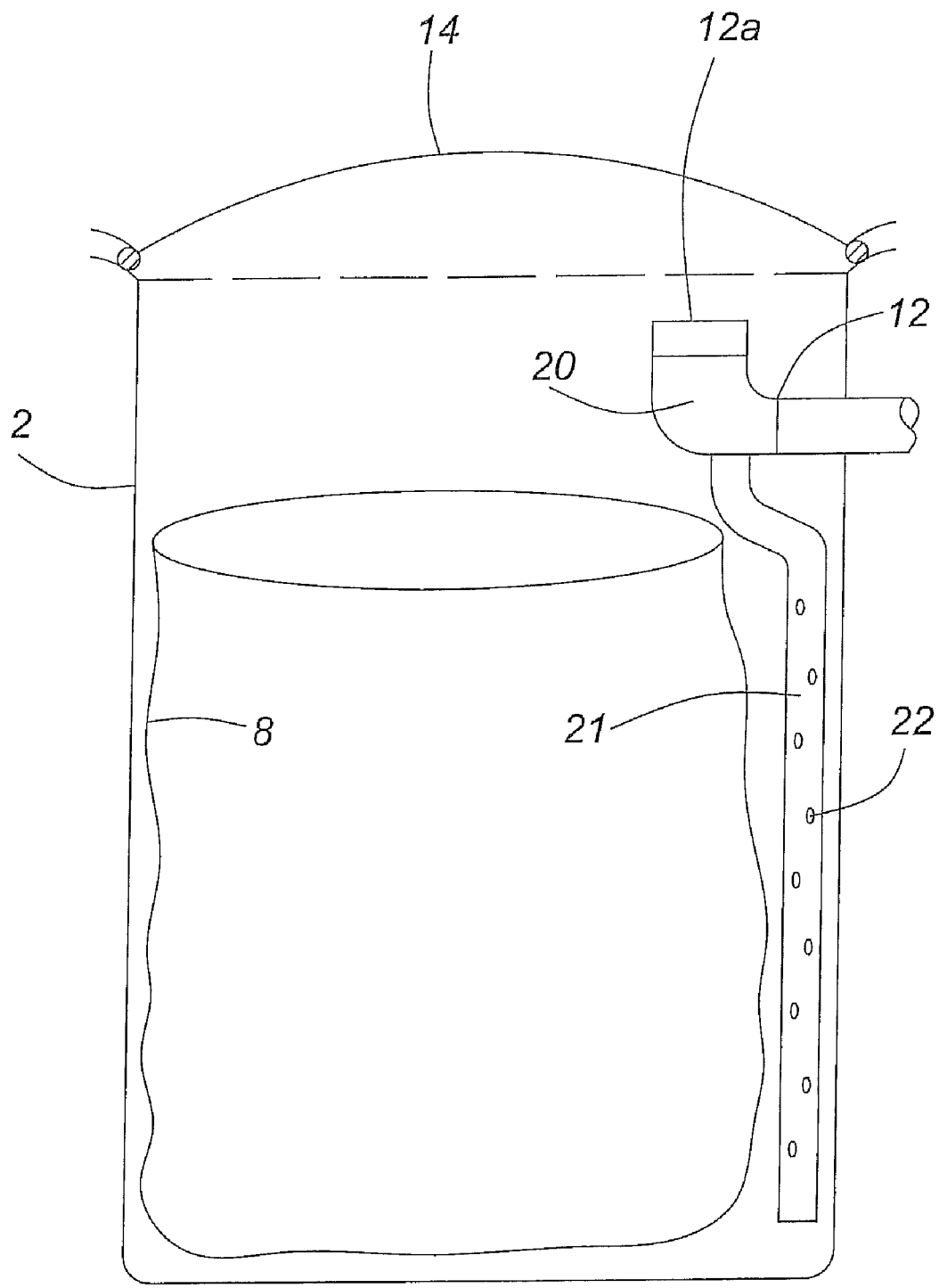
FIG. 4 is a sectional view of the distillation vessel showing the positional relationship between the bag and the anti-pressure device of FIG. 3.
Figure 5:
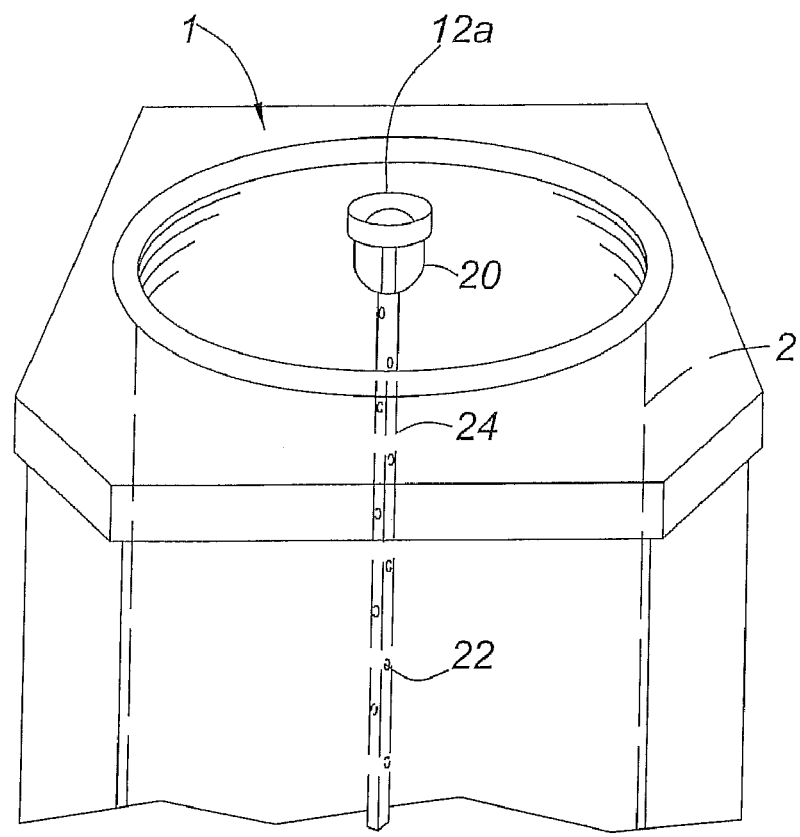
FIG. 5 is a perspective view of the distillation vessel showing an alternative form of the anti-pressure device according to the invention.

To solve this problem, the inventors have provided a means whereby vapour is still able to exit the vessel, regardless of any overflow from the bag or sludge blockage of the vapour outlet [12] and consequent pressure build-up as described above. Referring to FIGS. 3 and 4, in a preferred embodiment of the invention, the anti-pressure device of the invention comprises an elbow [20] (typically three quarter inch) attached to the outlet [12] for vapour escape. Thus, the vapour outlet [12a] is now formed by the entrance to the elbow and the elbow becomes the second side of the vapour outlet [12a]. A hole is provided in the bottom of the elbow, and is attached to a tube [21] forming a conduit extending downwardly adjacent the vessel wall, to the bottom of the vessel. The tube has holes [22] from top to bottom acting as a plurality of possible exits for vapour, each having a first side communicating with the vessel interior and a second side communicating through the elbow [20] with the vessel exterior. Therefore, if one hole is blocked by the bag, another is always open. Alternatively, as shown in FIG. 5, the conduit may be formed by a shroud [24] attached to the vessel wall and communicating with the elbow [20].

Figure 6:
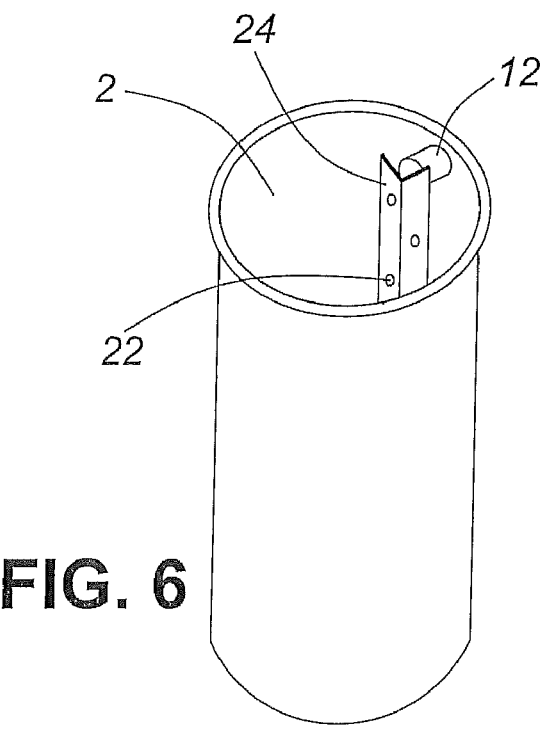
FIG. 6 is a detailed perspective view of another embodiment of the distillation vessel in which the shroud extends over the vapour outlet.

In a further embodiment as shown in FIG. 6, the shroud [24] extends over the vapour outlet. The shroud is made of angle iron with holes [22] along its entire length, extending from top to bottom along the side of the vessel from top to bottom of the vessel. Again, the plurality of holes in the shroud ensures that the vapour always has an unobstructed exit path from the vessel, through the second side of the vapour outlet. Whether the conduit for the vapour is formed by a tube or a shroud as described above, it is important that when using it in conjunction with a distillation bag, the conduit be located outside the bag as shown in FIG. 4, so as to ensure no pressure build up can occur from outside and/or under the bag.

Figure 7:
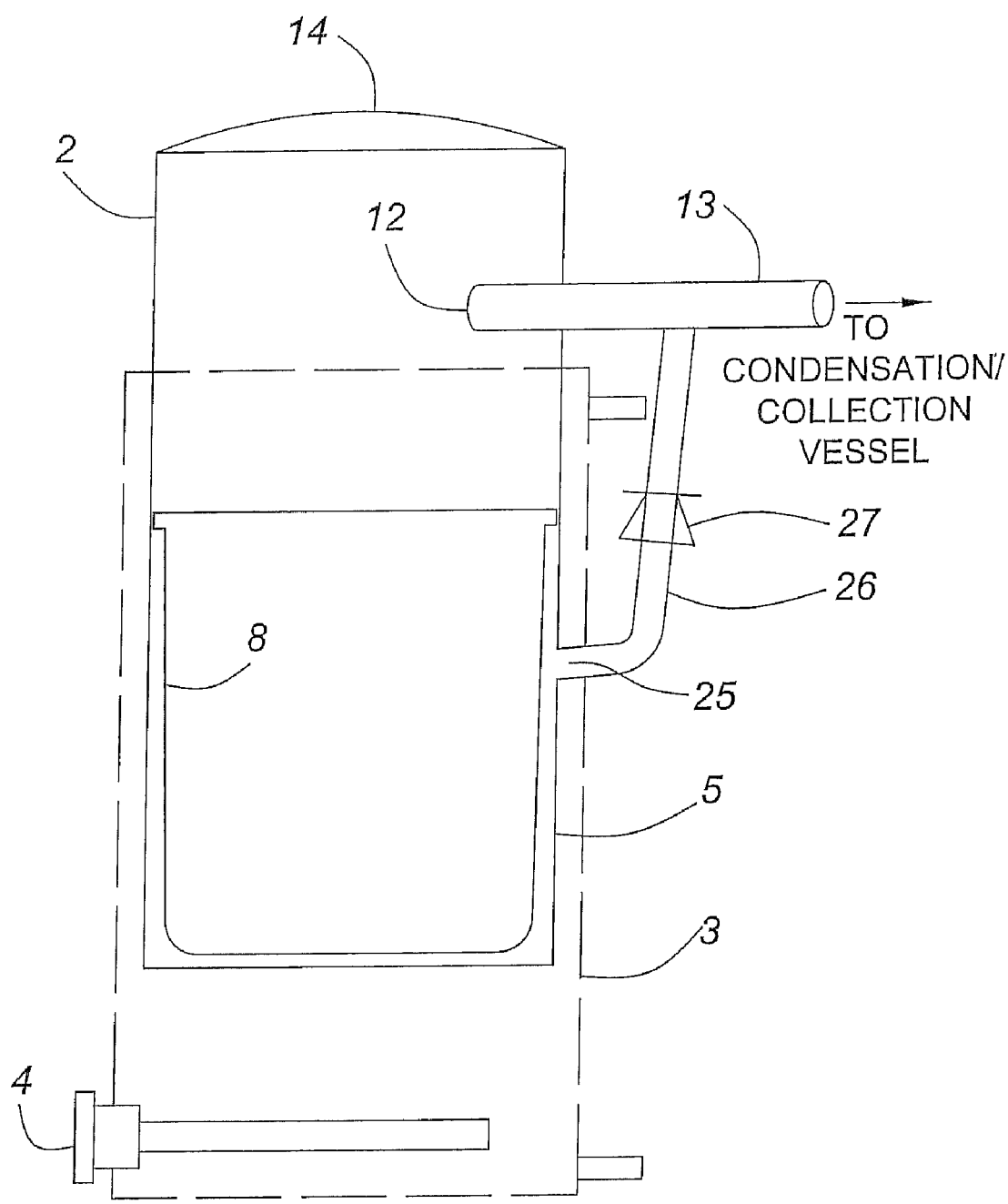
FIG. 7 is a side elevational view of an embodiment of the invention in which the shroud is replaced by a second vapour outlet.

In yet a further embodiment, as shown in FIG. 7, the tube or shroud may be dispensed with entirely and replaced by a second vapour outlet [25], spaced from the outlet [12], the second side of the outlet [25] communicating with an external conduit [26]. Conduit [26] can be connected (preferably through a one-way valve [27] to prevent reverse flow of vapour from the conduit [26] to the second outlet [25]) either to the first conduit [13] for vapour exiting through the outlet [12] or directly with the condensation/collection vessel.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. An apparatus used in the distillation of materials, said apparatus comprising a vessel, a bag within the interior of said vessel for containing said materials, said vessel having an internal wall surface and an outlet for vapor to exit said vessel from the distillation of said materials, an anti-pressure system for said vessel, said anti-pressure system wherein said outlet has a first side communicating with said vessel interior and a second side communicating with the exterior of said vessel, a conduit extending downwardly into said vessel adjacent said internal wall surface of said vessel and between said bag and said internal wall surface, said conduit communicating with said second side of said outlet, said conduit having at least one opening in communication with said vessel interior to allow vapor from said vessel to enter said conduit through said opening and to exit said vessel through said second side of said outlet, said conduit being formed by an elongated shroud secured to an internal wall surface of said vessel, said second side of said outlet formed by an elbow communicating with said vessel exterior and said conduit communicating with and extending downwardly from said elbow.

2. The combination of claim 1 wherein said conduit opening is located along said internal wall surface of said vessel.

3. The combination of claim 2 wherein said conduit includes a plurality of openings located along said internal wall surface.

* * * * *